(12) United States Patent
Shibusawa

(10) Patent No.: US 7,391,823 B2
(45) Date of Patent: Jun. 24, 2008

(54) DIGITAL BROADCASTING RECEIVER

(75) Inventor: Toru Shibusawa, Osaka (JP)

(73) Assignee: Sanyo Electric Co., Moriguchi-shi (JP)

( * ) Notice: Subject to any disclaimer, the term of this patent is extended or adjusted under 35 U.S.C. 154(b) by 1408 days.

(21) Appl. No.: 09/930,129

(22) Filed: Aug. 16, 2001

(65) Prior Publication Data
US 2002/0066104 A1    May 30, 2002

(30) Foreign Application Priority Data
Aug. 23, 2000    (JP)   ............................ 2000-251944

(51) Int. Cl.
*H04L 27/06* (2006.01)
*H04N 17/04* (2006.01)
*H04N 5/44* (2006.01)

(52) U.S. Cl. .................. 375/316; 375/344; 348/192; 348/725

(58) Field of Classification Search ................ 375/224, 375/316, 324, 325, 344, 346; 348/725, 726, 348/180, 192, 193, 731, 732; 455/67.11
See application file for complete search history.

(56) References Cited

U.S. PATENT DOCUMENTS

| | | | | |
|---|---|---|---|---|
| 5,276,714 | A | * | 1/1994 | Hori et al. .................. 375/368 |
| 5,483,690 | A | * | 1/1996 | Schroder .................. 455/226.1 |
| 5,493,310 | A | | 2/1996 | Ota |
| 5,579,121 | A | * | 11/1996 | Ohta et al. .................. 386/109 |
| 5,966,186 | A | * | 10/1999 | Shigihara et al. ............. 348/570 |
| 5,991,901 | A | | 11/1999 | Mulford et al. |
| 6,016,557 | A | * | 1/2000 | Kasprzyk et al. ............... 714/38 |
| 6,029,044 | A | | 2/2000 | Arsenault et al. |
| 6,243,568 | B1 | | 6/2001 | Detlef |
| 6,342,568 | B1 | | 1/2002 | Sunaga et al. |
| 6,389,070 | B1 | * | 5/2002 | Cugnini et al. ............... 375/232 |
| 2002/0146984 | A1 | * | 10/2002 | Suenaga ..................... 455/67.1 |
| 2003/0095600 | A1 | * | 5/2003 | Tsukagoshi ............ 375/240.13 |

FOREIGN PATENT DOCUMENTS

| | | |
|---|---|---|
| EP | 0687029 A1 | 12/1995 |
| EP | 0818923 A2 | 1/1998 |
| EP | 0818923 A3 | 8/1998 |

(Continued)

OTHER PUBLICATIONS

A Further Search Report under Section 17, Patent Act 1977, dated Nov. 27, 2002.

(Continued)

*Primary Examiner*—Young T. Tse
(74) *Attorney, Agent, or Firm*—Westerman, Hattori, Daniels & Adrian, LLP.

(57) ABSTRACT

A demodulation circuit generates information related to the frequency of error correction, and feeds the information to a CPU. The CPU acquires noise intensity data on the basis of the information related to the frequency of error correction from the demodulation circuit in view of noise intensity data corresponding to the frequency of error correction stored in a memory. The CPU feeds the acquired noise intensity data to a D/A converter. The D/A converter feeds a noise control voltage to a voltage controlled amplifier. Noises produced in a noise source are overlaid on a signal in an adder after the intensity thereof is adjusted in the voltage controlled amplifier.

20 Claims, 2 Drawing Sheets

FOREIGN PATENT DOCUMENTS

| | | |
|---|---|---|
| GB | 2307623 A | 5/1997 |
| GB | 2 319 979 A1 | 6/1997 |
| GB | 2310979 A | 9/1997 |
| GB | 2316280 A | 2/1998 |
| GB | 2330493 A | 4/1999 |
| JP | 2000-115654 | 4/2000 |
| WO | WO 97/34381 | 9/1997 |

OTHER PUBLICATIONS

A Further Search Report under Section 17, Patent Act 1977, dated Dec. 2, 2002.

UK Patent Office Examination Report dated Sep. 29, 2003.

* cited by examiner (a)

(b)

(c)

DIGITAL BROADCASTING RECEIVER

BACKGROUND OF THE INVENTION

Field of the Invention

The present invention relates generally to a digital broadcasting receiver for receiving digital broadcasting. The digital broadcasting receiver for receiving digital broadcasting using a satellite or a terrestrial broadcasting can select an arbitrary broadcasting wave out of a plurality of broadcasting waves received through a dedicated antenna or a terrestrial broadcasting antenna using a tuner, select an arbitrary channel out of a plurality of channels included in the selected broadcasting wave using demultiplex processing, extract a digital signal on the selected channel, and decode the extracted digital signal to output a video/audio signal.

In such a digital broadcasting receiver, the digital signal obtained by demodulation is subjected to error correction processing. Even if a signal error occurs, therefore, the same good image and audio as those in a case where there is no signal error are obtained within error correction can be made (hereinafter referred to as an error correctable range). On the other hand, when the intensity of a received signal strength is reduced so that the error rate is increased to exceed the error correctable range, a screen doesn't suddenly come on or freezes with respect to the video, while an audio output is stopped with respect to the audio.

Meanwhile, when an antenna of the digital broadcasting receiver is setup, the direction or the like of the antenna is adjusted by seeing the receiving condition. Even if the receiving condition is good at the beginning of the setup of the antenna, however, an obstruction to radio waves is formed on a path between a broadcasting sending station or a transponder (a satellite relay) and the antenna. Accordingly, the intensity of a received signal strength may be reduced, increasing the error rate. When the error rate exceeds the error correctable range, the screen freezes, for example, as described above. When the screen suddenly freezes, for example, from a state where broadcasting has been satisfactorily viewed, however, a viewer judges that a receiver develops a fault, to inquire of a shop or a maker about the fault. On the other hand, in a case where the error rate exceeds the error correctable range, if a message saying "Video cannot be displayed because received radio waves are weakened", for example, is composed and displayed on the screen, it is possible to prevent the viewer from mistaking the state for a fault. If it is reported in the earlier stages that the receiving condition is getting worse, the state can be coped with by setting up the antenna again, for example. If the message is not displayed until the screen freezes while a user is enjoying a program, however, the user may be given an uncomfortable feeling.

An object of the present invention is to provide a digital broadcasting receiver capable of informing a user that the receiving condition is getting worse before a screen freezes, for example.

SUMMARY OF THE INVENTION

In order to solve the above-mentioned problem, in a digital broadcasting receiver comprising an error correcting function for a demodulated digital signal, a digital broadcasting receiver according to the present invention is characterized by comprising a detector for detecting the receiving condition of a broadcasting wave; and a receiving condition reporting means for reporting by at least one of video and audio that the receiving condition is degraded in a stage where the degradation of the receiving condition of the broadcasting wave has not exceeded an error correctable range.

In the above-mentioned construction, even if the intensity of the received signal strength is reduced, increasing the error rate, it is reported to a user by at least one of video and audio that the receiving condition is degraded before a screen freezes, for example. The screen is prevented from freezing, for example, while a user is enjoying a program, providing the opportunity to set up the antenna again before the screen thus freezes, for example.

The receiving condition reporting means may be so constructed as to change the report by at least one of video and audio depending on the degree of the degradation of the receiving condition of the broadcasting wave. Consequently, the user can know the degree of the degradation of the receiving condition.

The receiving condition reporting means may comprise a noise generator for generating noises, an adder for adding the noises to at least one of video and audio, and a controller for controlling at least the adder on the basis of the results of the detection by the detector. Consequently, the report can be effective because the degradation of the image quality and the degradation of the tone quality are spuriously experienced, unlike a report by a message. Particularly by combining such construction that noises are added with such construction that the report by at least one of video and audio is changed depending on the degree of the degradation of the receiving condition of the broadcasting wave, as described above, the noises can be made to look as if they were gradually increased, as in an analog broadcasting receiver. Accordingly, such construction is suitable for a user who does not know that viewing is suddenly rendered impossible, which is peculiar to the digital broadcasting receiver.

The receiving condition reporting means may be operated for a predetermined time period at predetermined timing from the time when the viewing of broadcasting is started to the time when it is terminated. The report is made for several seconds in a stage where the power supply is turned on, for several seconds in a stage where an operation for turning the power supply off is performed, and for several seconds in a stage where a channel is changed, for example. Accordingly, it is possible to prevent the report from interrupting the viewing of broadcasting to the utmost. Further, the predetermined time period may be adjusted by user setting.

When a state where the receiving condition of the broadcasting wave is worse than a predetermined level occurs continuously during the predetermined time period, the report may be made in excess of the predetermined time period. Consequently, it is possible to force the user to set up the antenna again.

In a digital broadcasting receiver comprising an error correcting function for a demodulated digital signal, a digital broadcasting receiver according to the present invention is characterized by comprising a detector for detecting the receiving condition of a broadcasting wave; a controller for automatically detecting the receiving condition for each broadcasting wave by the detector at the time of adjusting an antenna and storing the results of the detection in a memory; a comparator for detecting the receiving condition of the broadcasting wave during viewing by the detector after adjusting the antenna and comparing the results of the detection and the results of the detection stored in the memory with each other; a judging means for judging whether or not the receiving condition of the broadcasting wave is liable to be degraded on the basis of the results of the comparison; and a receiving condition reporting means for reporting, when it is judged that the receiving condition is liable to be degraded, the judgment by at least one of video and audio. Consequently, it is possible to report, using the time of adjusting the antenna (the time of setting up the antenna or the time of readjusting the antenna after the setup) as a basis, the relative degradation of the subsequent receiving condition to the user.

It is desirable that there are provided a path for introducing a video signal and an audio signal to a video display/audio output unit and a path for introducing the video signal and the audio signal to a video recorder, and a report signal is not inputted to the path for introducing the signals to the video recorder and is inputted to only the path for introducing the signals to the video display/audio output unit. Consequently, it is possible to prevent a situation where the report signal is video-recorded/audio-recorded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described on the basis of FIGS. 1 to 3. Here, a case where a user views terrestrial broadcasting digital broadcasting is illustrated.

Figure 1:
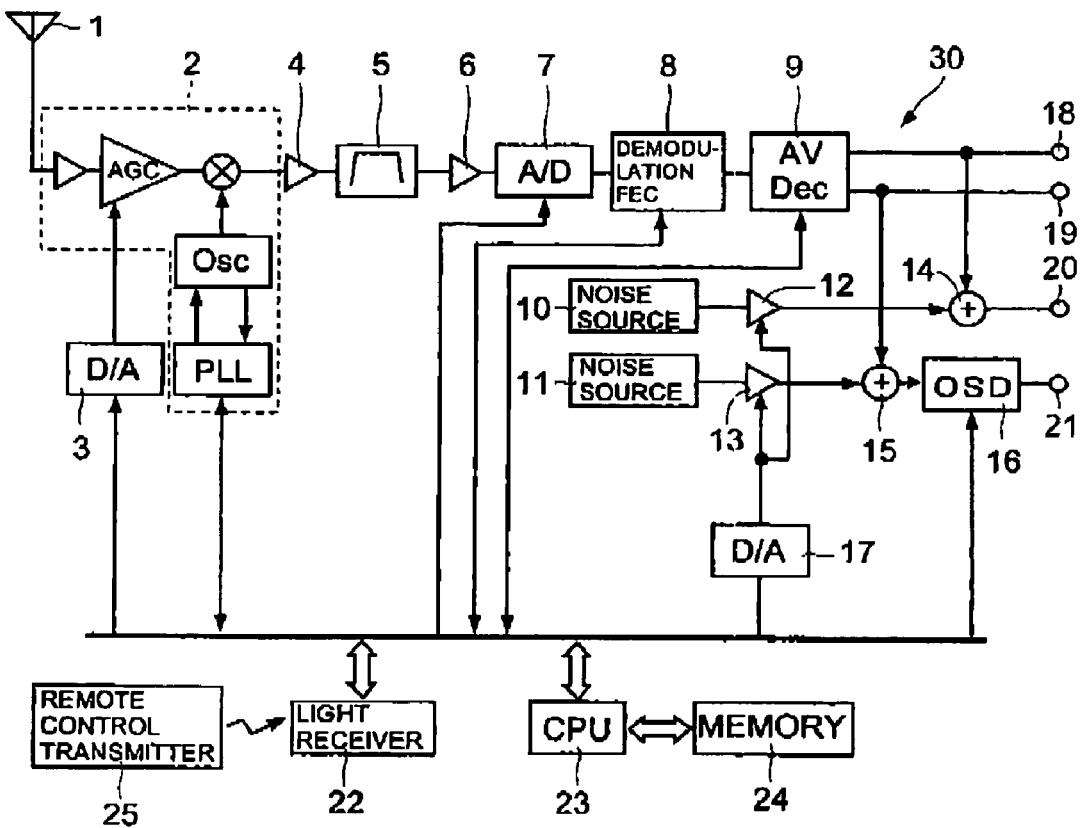
FIG. 1 is a block diagram showing a digital broadcasting receiver 30 according to the present embodiment for receiving terrestrial broadcasting digital broadcasting.

An antenna 1 shown in FIG. 1 receives a digital broadcasting signal fed from a ground broadcasting station and feeds the received digital broadcasting signal to a tuner 2. A D/A (Digital-to-Analog) converter 3 subjects AGC control data fed from a CPU 23 to digital-to-analog conversion, and feeds a gain control voltage obtained thereby to an AGC (Automatic Gain Control) amplifier in the tuner 2. The tuner 2 controls the gain of received radio waves using the AGC amplifier, and comprises a local oscillation circuit (Osc), a phase-locked loop (PLL) circuit, a mixer, and so on, to output an intermediate frequency signal of a broadcasting wave tuned in to. The intermediate frequency signal is subjected to inter-stage buffering and level adjustment in intermediate frequency amplifiers 4 and 6, and is inputted to an A/D (Analog-to-Digital) converter 7 and outputted as a digital signal after its unnecessary frequency component is removed in a band-pass filter 5.

A demodulation circuit 8 receives the digital signal, performs demodulation processing (QPSK (Quadrature Phase Shift Keying) demodulation, etc.), error correction processing (FEC: Forward Error Correction) of an error occurring in a transmission path, and so on, and outputs a video transport packet and an audio transport packet based on MPEG2 (Moving Picture Experts Group2).

An AV decoder (AV Dec) 9 comprises a video decoder for decoding the video transport packet, and an audio decoder for decoding the audio transport packet. The video decoder decodes an inputted variable length code to find a quantization factor and a motion vector, and carries out inverse DCT (Discrete Cosine Transformation) conversion and motion compensation control based on the motion vector, to produce video data. The video data is subjected to digital-to-analog conversion, to produce a composite signal in an NTSC (National Television System Committee) format, for example. The audio decoder decodes an inputted coded signal, to produce audio data. The audio data is subjected to digital-to-analog conversion, to generate an analog audio signal.

The analog audio signal is fed to an audio input unit in a video recorder (not shown) from a first audio output path 18, and the composite signal is fed to a video input unit in the video recorder (not shown) from a first video output path 19. On the other hand, an analog audio signal passing through an adder 14 is fed to a speaker (not shown) from a second audio output path 20, and a video signal passing through an adder 15 and an OSD (On-Screen Display) circuit 16 is fed to a display (not shown) from a second video output path 21. The OSD circuit 16 performs processing for incorporating into a video signal bit map data based on character information or color information whose output instruction is issued from a CPU 23.

Each of noise sources 10 and 11 is so constructed as to produce random noises such as white noises. The random noises outputted from the noise source 10 are fed to the adder 14 after the level thereof is adjusted from a zero level (gain 0) to a predetermined level by passing through a voltage controlled amplifier 12. The adder 14 adds the noises to the audio signal, and outputs the audio signal. The random noises outputted from the noise source 11 are fed to the adder 15 after the level thereof is adjusted from a zero level (gain 0) to a predetermined level by passing through a voltage controlled amplifier 13. The adder 15 adds the noises to the video signal, and outputs the video signal.

A D/A converter 17 feeds to the voltage controlled amplifiers 12 and 13 a noise control voltage obtained by subjecting noise intensity data fed from the CPU 23 to digital-to-analog conversion. Each of the voltage controlled amplifiers 12 and 13 outputs noises having intensity based on the noise control voltage.

A remote control transmitter 25 is a transmitter for sending a command to the broadcasting receiver 30. When a key (not shown) provided in the remote control transmitter 25 is operated, signal light (a remote control signal) meaning a command corresponding to the key is emitted from a light emitter (not shown). A remote control light receiver 22 receives the signal light, converts the received signal light into an electric signal, and feeds the electric signal to the CPU 23.

A memory 24 stores message data for making a report related to the present invention, information related to a report starting point, noise intensity data corresponding to the frequency of error correction, information related to start/stop control of a reporting operation, information related to a receiving condition for each broadcasting wave at the time of adjusting an antenna, and so on in addition to information related to channel setting or the like.

The CPU 23 performs the following processing as processing related to the present invention.

① The CPU 23 acquires the information related to the frequency of error correction obtained in performing error correction processing from the demodulation circuit 8, and does monitoring as to whether or not the frequency of error correction exceeds the report starting point. In the present embodiment, the report starting point is set within a range in which even if errors occur, all the errors can be corrected.

Figure 2:
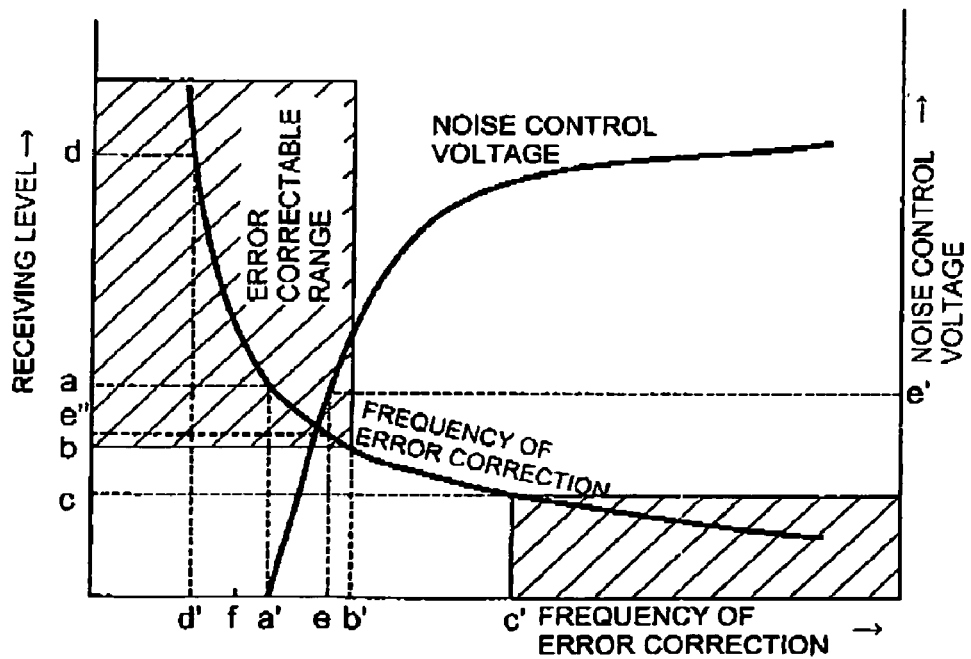
FIG. 2 is a graph showing the relationship between the frequency of error correction and a noise control voltage.

Specifically, when a limit point of the range in which all the errors can be corrected is taken as point b' (point b at the receiving level), the report starting point is set at point a' (point a at the receiving level) at which the frequency of error correction is lower, as shown in FIG. 2. In FIG. 2, a range from the point b' to point c' (the point b to point c at the receiving level) shall be a range in which errors cannot be corrected because they sometimes to always appear. When the frequency of error correction exceeds the point c' (the receiving level is lower than that at the point c), the errors cannot be corrected at all, resulting in a state where the screen freezes, for example.

② When the CPU 23 reads out, when the frequency of error correction exceeds the report starting point, noise intensity data corresponding to the frequency of error correction from the memory 24, and feeds the data to the D/A converter 17. A noise control voltage having a value corresponding to the noise intensity data is fed to the voltage controlled amplifiers 12 and 13 from the D/A converter 17. Each of the voltage controlled amplifiers 12 and 13 outputs noises having intensity based on the noise control voltage. The noises are respectively overlaid on an audio signal and a video signal by the adders 14 and 15.

Figure 3:
FIGS. 3(a)-3(c) are illustrations showing an output on a screen.
Figure 3:
Figure 3:
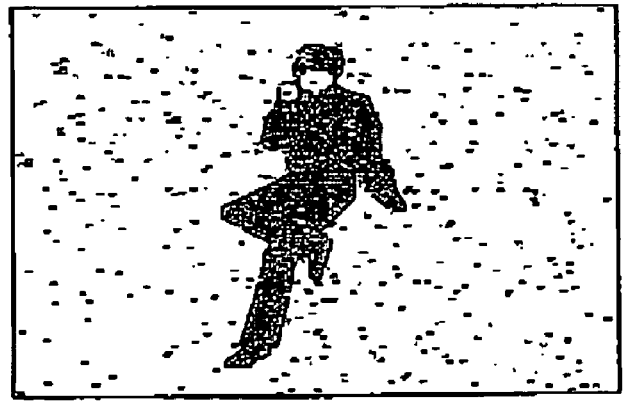

FIG. 3 shows how the noises appear on the screen, where FIG. 3(a) shows a state where the frequency of error correction exceeds the report starting point, FIG. 3(b) illustrates a state where the frequency of error correction is made higher than that shown in FIG. 3(a) and FIG. 3(c) illustrates a state where the frequency of error correction is made higher than that shown in FIG. 3(b).

In analog broadcasting, noises are gradually mixed with video and audio as a received signal strength is lowered, thereby degrading the image quality and the tone quality. Conversely, in digital broadcasting, if the received signal strength is at not less than a predetermined level, the same image quality is obtained irrespective of the level. On the other hand, once the received signal strength is below the predetermined level, no error correction can be made, resulting in such a phenomenon known as a so-called cliff effect that video and audio entirely fade out.

Specifically, description is made with reference to FIG. 2. The tone quality and the image quality do not vary depending on whether broadcasting is viewed at point d at which the receiving level is high (point d' in the frequency of error correction) or is received at point e (point e" at the receiving level) just short of the limit point b' of the range in which all the errors can be corrected. Accordingly, the user cannot know that the receiving level is getting worse. Only a slight drop from the point e" to the point c (the point c' in the frequency of error correction), for example, from a state where the broadcasting is received at the point e" to a state where the adjustment of the direction of the antenna is shifted or an obstruction is formed in the direction in which radio waves arrive causes video and audio to entirely fade out.

From a stage where the degradation of the receiving condition of a broadcasting wave has not exceeded the error correctable range yet (a stage at the point a' shown in FIG. 2 in the present embodiment), noises are overlaid on video and audio. At the time of viewing at the above-mentioned point e", a noise control voltage is outputted at the level of the point e', so that the noises have already been included in video and audio. Before video and audio entirely fade out, therefore, the rearrangement of the antenna can be completed. Accordingly, the user is not confused while he or she is viewing a program, and it is possible to prevent the failure of video recording during absence or using a timer. Further, the amount of noises overlaid depending on the degree of the degradation of the receiving condition of the broadcasting wave is changed. Therefore, the user can know the degree of the degradation of the receiving condition. Further, such a report by noises becomes effective because the degradation of the image quality and the tone quality are spuriously experienced, unlike a report by a message. Particularly, the noises are made to look as if they were gradually increased, as in analog broadcasting. Accordingly, the report by noises is suitable for a user who does not know that viewing is suddenly rendered impossible, which is peculiar to the digital broadcasting receiver.

③ The CPU 23 performs a reporting operation for a predetermined time period at predetermined timing from the time when the viewing of the broadcasting is started to the time when it is terminated. A report is made for several seconds in a stage where the power supply is turned on, for several seconds in a stage where an operation for turning the power supply off is performed, and for several seconds in a stage where a channel is changed, for example. By such control, it is possible to prevent the report from interrupting the viewing of the broadcasting to the utmost. When such control is carried out, and error correction cannot be entirely made, resulting in a state where the screen freezes (when the frequency of error correction exceeds the point c' in FIG. 2), such control that the report is resumed may be carried out. In such a case, the viewer experientially judges that the state is due to not a fault but the degradation of the receiving condition.

④ When the user issues a command to change setting for the above-mentioned predetermined time period (hereinafter referred to as a report time width) using the remote control transmitter 25, for example, the CPU 23 changes the report time width. If the report time width is set to five seconds at the time of shipment, for example, and the user feels the report time width to be long, the user changes and sets the report time width to two seconds, for example.

⑤ When a state where the receiving condition of broadcasting waves is worse than a predetermined level occurs continuously during the report time width, for example, when a state where the frequency of error correction is not more than the point e" in FIG. 2 occurs continuously during the report time width, the report is made in excess of the report time width. Even when the report time width is 5 seconds or is changed to two seconds by user setting, as described above, the reporting operation is continued over ten seconds, for example. In such a case, the user recognizes that the receiving level is significantly degraded, so that the user is forced to set up the antenna again.

⑥ The CPU 23 automatically detects the receiving condition (the frequency of error correction) for each broadcasting wave, and stores the results thereof in the memory 24. This processing shall be performed when the antenna is adjusted. For example, such processing is performed by a user operating an antenna adjustment initial information input button provided in the remote control transmitter 25 or putting a cursor on characters "Input antenna adjustment initial information" which is an operation button displayed on the screen to operate a determination button of the remote control transmitter 25. By this processing, the receiving condition for each broadcasting wave at the time of adjusting the antenna is grasped. After the antenna is adjusted, the receiving condition of broadcasting waves during viewing is detected. Several months or several years after the antenna is adjusted, an obstruction to radio waves is formed on a path from a broadcasting sending station to the antenna. Accordingly, the intensity of the received signal strength may be degraded, thereby increasing the error rate. The detected receiving condition and the results of the detection at the beginning of the adjustment of the antenna stored in the memory 24 are compared with each other. It is judged whether or not the receiving condition of the broadcasting wave is liable to be degraded on the basis of the results of the comparison. When it is judged that the receiving condition is liable to be degraded, information related to a message is read out from the memory 24. The contents of the message are "The receiving condition is being worse than that at the time of adjusting an antenna. Please adjust the antenna again". The message read out from the memory 24 is given to the OSD 16. The message is displayed on the screen by the OSD 16.

The present invention is not limited to a report by such message display. For example, the above-mentioned report by noise overlay may be made. If the receiving condition in a certain broadcasting wave at the time of adjusting the antenna is at point f in FIG. 2, a point obtained by adding a predetermined margin to the point f is taken as point a' (a noise overlay starting point). Consequently, the user knows how the relative receiving condition is degraded on the basis of a receiving environment at the time point where the antenna is adjusted in the form of screen noises or audio noises.

Although the receiving condition of the broadcasting wave is detected using the frequency of error correction obtained in the demodulation circuit 8, the present invention is not limited to the same. For example, the C/N ratio may be outputted in the tuner 2, and the C/N ratio may be used for detecting the receiving condition of the broadcasting wave. Although the present invention was described as a terrestrial broadcasting digital broadcasting receiver, the present invention may be a BS digital broadcasting receiver or a CS digital broadcasting receiver, in which case the same advantage is obtained.

As described in the foregoing, according to the present invention, even if the intensity of the received signal strength is reduced, increasing the error rate, it is reported to the user by at least one of video and audio that the receiving condition has been degraded before the screen freezes, for example. Accordingly, the screen is prevented from suddenly freezing, for example, while the user is enjoying a program, providing the opportunity to set up the antenna again before the screen thus freezes, for example. If the report by at least one of video and audio is changed depending on the degree of the degradation of the receiving condition of the broadcasting wave, the user can know the degree of the degradation of the receiving condition. The report by noises becomes effective because the degradation of the image quality and the tone quality is spuriously experienced. Particularly, the noises are made to look as if they were gradually increased, as in an analog broadcasting receiver. Accordingly, the report by noises is suitable for a user who does not know that viewing is suddenly rendered impossible, which is peculiar to the digital broadcasting receiver. If the report is made during several seconds in a stage where the power supply is turned on, for example, it is possible to prevent the report from interrupting the viewing of the broadcasting to the utmost. If the report is continuously made in a case where there continuously occurs a state where the receiving condition of the broadcasting wave is worse than a predetermined level, the user can be forced to set up the antenna again. Further, if information related to the initial receiving condition of the setup of the antenna is stored in the memory, to make a report on the basis of comparison with the subsequent receiving condition, it is possible to report, using the time of adjusting the antenna (the time of setting up the antenna or the time of adjusting the antenna after the setup) as a basis, the degradation of the subsequent receiving condition to the user. If a report signal is not inputted to the video recorder, it is possible to prevent a situation where the report signal is video-recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital broadcasting receiver comprising:
   a circuit for correcting errors in a broadcasting wave;
   a detector for detecting a receiving condition of the broadcasting wave based on a frequency of error correction by the circuit for correcting errors in the broadcasting wave; and
   a receiving condition reporting means for reporting by at least one of video and audio that the receiving condition is degraded in a state where a degradation of the receiving condition of the broadcasting wave has not exceeded an error correctable range,
   wherein said receiving condition reporting means starts reporting that the receiving condition is degraded in response to the frequency of error correction exceeding a report starting point, the report starting point being set within a range in which, even if errors occur, all errors can be corrected.

2. The digital broadcasting receiver according to claim 1, wherein
   said receiving condition reporting means changes the report by the at least one of video and audio depending on a degree of the degradation of the receiving condition of the broadcasting wave.

3. The digital broadcasting receiver according to claim 2, wherein
   said receiving condition reporting means comprises a noise generator for generating noises, an adder for adding said noises to the at least one of video and audio, and a controller for controlling at least said adder on the basis of the results of the detection by said detector.

4. The digital broadcasting receiver according to claim 3, wherein
   said receiving condition reporting means is operated for a predetermined time period at predetermined timing during a time when viewing of broadcasting is started to a time when the viewing of the broadcasting is terminated.

5. The digital broadcasting receiver according to claim 4, wherein
   said predetermined time period is adjusted by user setting.

6. The digital broadcasting receiver according to claim 5, wherein
   when a state where the receiving condition of the broadcasting wave is worse than a predetermined level occurs continuously during said predetermined time period, said receiving condition reporting means is operated in excess of said predetermined time period.

7. The digital broadcasting receiver according to claim 4, wherein
   when a state where the receiving condition of the broadcasting wave is worse than a predetermined level occurs continuously during said predetermined time period, said receiving condition reporting means is operated in excess of said predetermined time period.

8. The digital broadcasting receiver according to claim 2, wherein
   said receiving condition reporting means is operated for a predetermined time period at predetermined timing during a time when viewing of broadcasting is started to a time when the viewing of the broadcasting is terminated.

9. The digital broadcasting receiver according to claim 8, wherein
   said predetermined time period is adjusted by user setting.

10. The digital broadcasting receiver according to claim 9, wherein when a state where the receiving condition of the broadcasting wave is worse than a predetermined level occurs continuously during said predetermined time period, said receiving condition reporting means is operated in excess of said predetermined time period.

11. The digital broadcasting receiver according to claim 8, wherein
when a state where the receiving condition of the broadcasting wave is worse than a predetermined level occurs continuously during said predetermined time period, said receiving condition reporting means is operated in excess of said predetermined time period.

12. The digital broadcasting receiver according to claim 1, wherein
said receiving condition reporting means comprises a noise generator for generating noises, an adder for adding said noises to the at least one of video and audio, and a controller for controlling at least said adder on the basis of the results of the detection by said detector.

13. The digital broadcasting receiver according to claim 12, wherein
said receiving condition reporting means is operated for a predetermined time period at predetermined timing during a time when viewing of broadcasting is started to a time when the viewing of the broadcasting is terminated.

14. The digital broadcasting receiver according to claim 13, wherein
said predetermined time period is adjusted by user setting.

15. The digital broadcasting receiver according to claim 14, wherein
when a state where the receiving condition of the broadcasting wave is worse than a predetermined level occurs continuously during said predetermined time period, said receiving condition reporting means is operated in excess of said predetermined time period.

16. The digital broadcasting receiver according to claim 13, wherein
when a state where the receiving condition of the broadcasting wave is worse than a predetermined level occurs continuously during said predetermined time period, said receiving condition reporting means is operated in excess of said predetermined time period.

17. The digital broadcasting receiver according to claim 1, wherein
said receiving condition reporting means is operated for a predetermined time period at predetermined timing during a time when viewing of broadcasting is started to a time when the viewing of the broadcasting is terminated.

18. The digital broadcasting receiver according to claim 17, wherein
said predetermined time period is adjusted by user setting.

19. The digital broadcasting receiver according to claim 18, wherein
when a state where the receiving condition of the broadcasting wave is worse than a predetermined level occurs continuously during said predetermined time period, said receiving condition reporting means is operated in excess of said predetermined time period.

20. The digital broadcasting receiver according to claim 17, wherein
when a state where the receiving condition of the broadcasting wave is worse than a predetermined level occurs continuously during said predetermined time period, said receiving condition reporting means is operated in excess of said predetermined time period.

* * * * *